(12) United States Patent
Kim et al.

(10) Patent No.: US 8,974,944 B2
(45) Date of Patent: Mar. 10, 2015

(54) ELECTRODE ASSEMBLY AND RECHARGEABLE BATTERY USING THE SAME

(75) Inventors: Jake Kim, Yongin-si (KR); Nam-Soon Choi, Yongin-si (KR); Jong-Man Kim, Yongin-si (KR); Sung-Soo Kim, Yongin-si (KR); Kyeong-Beom Cheong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 265 days.

(21) Appl. No.: 12/971,808

(22) Filed: Dec. 17, 2010

(65) Prior Publication Data

US 2012/0015244 A1 Jan. 19, 2012

(30) Foreign Application Priority Data

Jul. 16, 2010 (KR) ........................ 10-2010-0069152

(51) Int. Cl.
  *H01M 2/34* (2006.01)
  *H01M 10/0585* (2010.01)
  *H01M 10/04* (2006.01)
  *H01M 10/0525* (2010.01)
  *H01M 10/42* (2006.01)

(52) U.S. Cl.
  CPC .......... *H01M 10/0585* (2013.01); *H01M 2/347* (2013.01); *H01M 2/34* (2013.01); *H01M 10/0431* (2013.01); *H01M 10/0525* (2013.01); *H01M 10/4235* (2013.01); *H01M 2200/00* (2013.01); *Y02E 60/122* (2013.01)
  USPC ............................. 429/129; 429/144; 429/145

(58) Field of Classification Search
  USPC .......................... 429/129, 131, 163, 167, 168
  See application file for complete search history.

(56) References Cited

U.S. PATENT DOCUMENTS

| 4,830,940 | A  | * | 5/1989 | Keister et al. ................... 429/94 |
| 6,797,429 | B1 | * | 9/2004 | Komatsu ....................... 429/163 |
| 7,604,895 | B2 |   | 10/2009 | Kim et al. |
| 7,981,537 | B2 |   | 7/2011 | Han |
| 2002/0034685 | A1 | * | 3/2002 | Sato et al. ...................... 429/176 |
| 2005/0266292 | A1 | * | 12/2005 | Kim et al. ....................... 429/34 |

(Continued)

FOREIGN PATENT DOCUMENTS

| KR | 10-2002-0018961 | 3/2002 |
| KR | 10-2004-0092105 | 3/2004 |
| KR | 10-2005-0095956 | 10/2005 |

(Continued)

OTHER PUBLICATIONS

Extended European Search Report dated Oct. 6, 2011 for corresponding EP Application No. 11158526.1.

*Primary Examiner* — Ula C. Ruddock
*Assistant Examiner* — Scott J Chmielecki
(74) *Attorney, Agent, or Firm* — Knobbe Martens Olson & Bear LLP

(57) ABSTRACT

An electrode assembly comprises a first electrode including a first electrode current collector and a first electrode active material layer, a second electrode including a second electrode current collector and a second electrode active material layer, a separator disposed between the first electrode and the second electrode, and an electrode absorbing member in contact with the first electrode.

12 Claims, 12 Drawing Sheets

(56) References Cited

U.S. PATENT DOCUMENTS

2008/0102359 A1* 5/2008 Kogetsu et al. ............... 429/129
2008/0171265 A1* 7/2008 Iriyama et al. ............. 429/231.8
2008/0213669 A1   9/2008 Nakahara et al.
2009/0208835 A1* 8/2009 Horiuchi et al. ............... 429/156
2010/0330422 A1* 12/2010 Kim et al. .................... 429/220
2012/0021274 A1* 1/2012 Kim et al. .................... 429/151

FOREIGN PATENT DOCUMENTS

| KR | 10-2007-0028228 | 3/2007 |
| KR | 10-2007-0094147 | 9/2007 |
| KR | 10-2009-0008071 | 1/2009 |
| KR | 10-2009-0035984 | 4/2009 |

* cited by examiner

ELECTRODE ASSEMBLY AND RECHARGEABLE BATTERY USING THE SAME

RELATED APPLICATIONS

This application claims priority to and the benefit of Korean Patent Application No. 10-2010-0069152 filed in the Korean Intellectual Property Office on Jul. 16, 2010, the entire content of which is incorporated herein by reference.

BACKGROUND

1. Field

The described technology relates generally to an electrode assembly and a rechargeable battery. More particularly, the described technology relates generally to an electrode assembly with an improved safety structure and a rechargeable battery.

2. Description of the Related Art

A rechargeable battery differs from a primary battery because a rechargeable battery can be repeatedly charged and discharged, while a primary battery typically can only irreversibly convert chemical energy to electrical energy. The low-capacity rechargeable battery is typically used as the power supply for small electronic devices, such as cellular phones, notebook computers and camcorders, while the high-capacity rechargeable battery is typically used as the power supply for driving motors in hybrid vehicles and the like.

A high-power rechargeable battery using non-aqueous electrolyte with a high energy density has been recently developed. For example, the high-power rechargeable battery is typically constructed with a high-capacity rechargeable battery having a plurality of rechargeable cells coupled to each other in series such that it can be used as the power supply for driving motors in electric vehicles requiring high power.

The rechargeable battery may have a cylindrical shape, a prismatic shape, a pouch shape, etc.

If conductive foreign particles, such as a nail or a screw, enter the rechargeable battery from outside the battery, a short circuit may occur in the rechargeable battery. In the event of a short circuit, the internal temperature of the rechargeable battery may sharply rise and the rechargeable battery may ignite or explode.

The information in this section is only to enhance understanding of the background of the invention and therefore may contain information that does not form prior art.

SUMMARY

Embodiments of the present invention provide a rechargeable battery with improvements in safety.

An electrode assembly according to an embodiment of the present invention comprises a first electrode including a first electrode current collector and a first electrode active material layer, a second electrode including a second electrode current collector and a second electrode active material layer, a separator disposed between the first electrode and the second electrode, and an electrode absorbing member in contact with the first electrode.

The electron absorbing member may include an electron absorbing layer and a blocking layer surrounding the electrode absorbing layer, and the electron absorbing layer may include an acrylate-based material.

The electron absorbing layer may be formed of PTMA (Poly (2,2',6,6'-tetramethylpiperidinyloxy methacrylate), and the blocking layer may be formed of an elastic material.

The blocking layer may be formed of a material that is impervious to ions, and the blocking layer may be formed of a material selected from a group consisting of polyamide-based elastomer, poly urethane-based elastomer, polyolefine-based elastomer, polyester-based elastomer, styrene-based elastomer, and fluorine-based elastomer.

The electron absorbing member may be disposed at an outermost side of the electrode assembly, and the electron absorbing member may be disposed between a pair of the first electrodes. The electron absorbing member may contact a current collector of the first electrode.

A rechargeable battery according to another embodiment of the present invention comprises an electrode assembly including a first electrode, a second electrode, a separator disposed between the first and second electrodes, and an electrode absorbing member stacked with the first electrode, a case for housing the electrode assembly, and a terminal electrically connected with the electrode assembly and exposed outside the case.

The electron absorbing member may include an electron absorbing layer and a blocking layer surrounding the electron absorbing layer, and the electron absorbing layer may be formed of an acrylate-based material.

The electron absorbing layer may be formed of PTMA (Poly (2,2',6,6'-tetramethylpiperidinyloxy methacrylate)), and the blocking layer may be formed of an elastic material.

The blocking layer may be formed of a polymer sheet that is impervious to ions, and the blocking layer may be formed of a material selected from a group consisting of polyamide-based elastomer, poly urethane-based elastomer, polyolefine-based elastomer, polyester-based elastomer, styrene-based elastomer, and fluorine-based elastomer.

The first electrode may include a first electrode current collector and a first electrode active material layer coupled to the first electrode current collector, and the electron absorbing member may contact the first electrode, and the electron absorbing member may contact the first electrode current collector.

The electron absorbing member may be disposed at an outermost side of the electrode assembly, and the electron absorbing member may be disposed between a pair of the first electrodes. The electron absorbing member may be disposed between the first and second electrodes.

According to the embodiments of the present invention, the electron absorbing member absorbs electrons when disruptions such as entry of foreign particles occur so that the safety of the rechargeable battery can be improved.

DETAILED DESCRIPTION OF THE EMBODIMENTS

Figure 1:
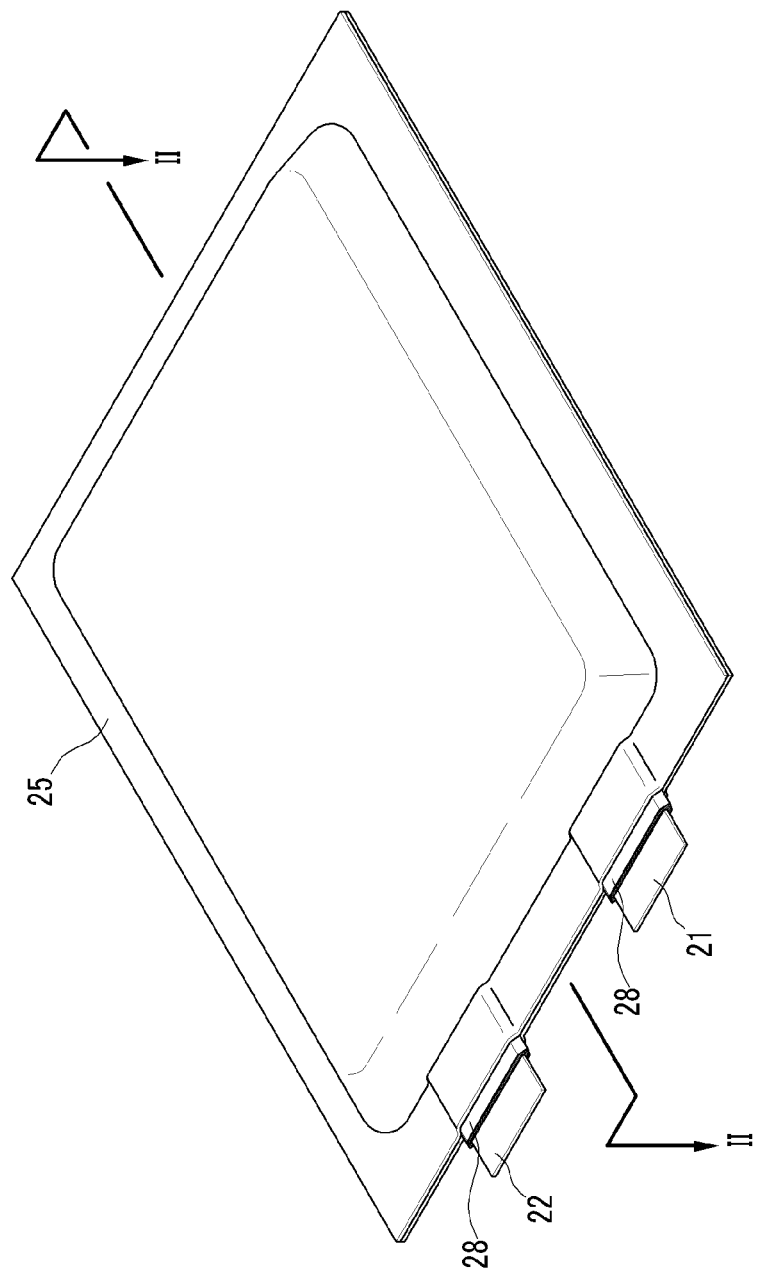
FIG. 1 is a perspective view of a rechargeable battery according to a first embodiment of the present invention.

The present invention will be described more fully hereinafter with reference to the accompanying drawings, in which various embodiments of the invention are shown. As those skilled in the art would realize, the described embodiments may be modified in various different ways, all without departing from the spirit or scope of the present invention. In the specification and drawings, like reference numerals indicate like components.

Figure 2:
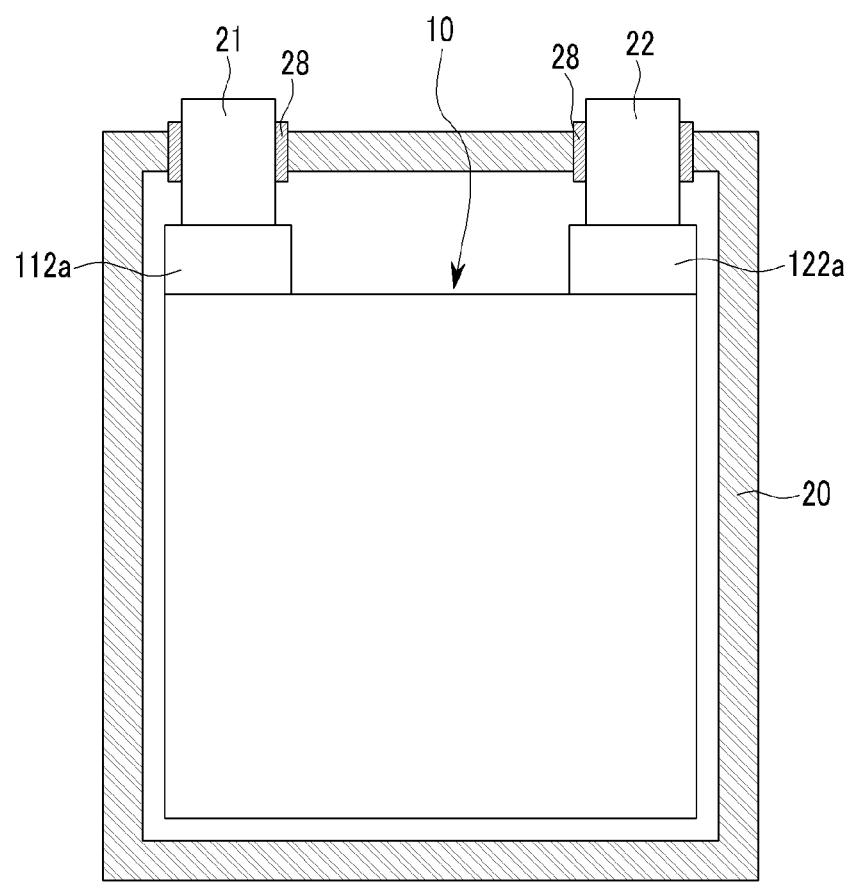
FIG. 2 is a cross-sectional view of FIG. 1, taken along the line II-II.

FIG. 1 is a perspective view of a rechargeable battery according to a first embodiment of the present invention and FIG. 2 is a cross-sectional view of FIG. 1, taken along the line II-II.

Referring to FIG. 1 and FIG. 2, a rechargeable battery 101 according to embodiments includes an electrode assembly 10 performing charging and discharging and a case 25 in which the electrode assembly 10 is installed.

The case 25 can completely cover the rechargeable battery 101 and provide a space for installing the electrode assembly 10. The case 25 may be formed as a pouch with a film attached. However, the present invention is not limited thereto, and the case may be formed with various shapes including a cylindrical or prismatic shape.

A first terminal 21 and a second terminal 22 may be electrically connected to the electrode assembly 10, and the first and second terminals 21 and 22 may protrude to the outside of the case 25.

The first terminal 21 may be electrically connected to a first electrode uncoated region 112a, and the second terminal 22 may be electrically connected to a second electrode uncoated region 122a. An insulating layer 28 may be provided between the first terminal 21, the second terminal 22, and the case 25 for insulation therebetween. The first and second terminals 21 and 22 according to the present embodiment may protrude toward the same direction from the case 20, but the present invention is not limited thereto. That is, the first and second terminals 21 and 22 may protrude toward directions that are opposite to each other.

Figure 3:
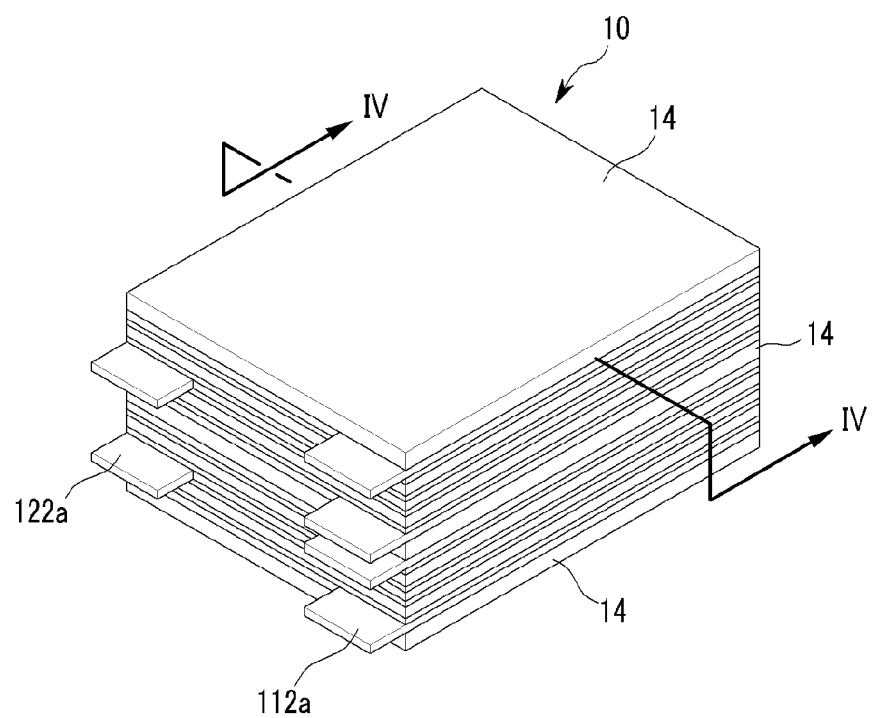
FIG. 3 is a perspective view of an electrode assembly according to the first embodiment of the present invention.
Figure 4:
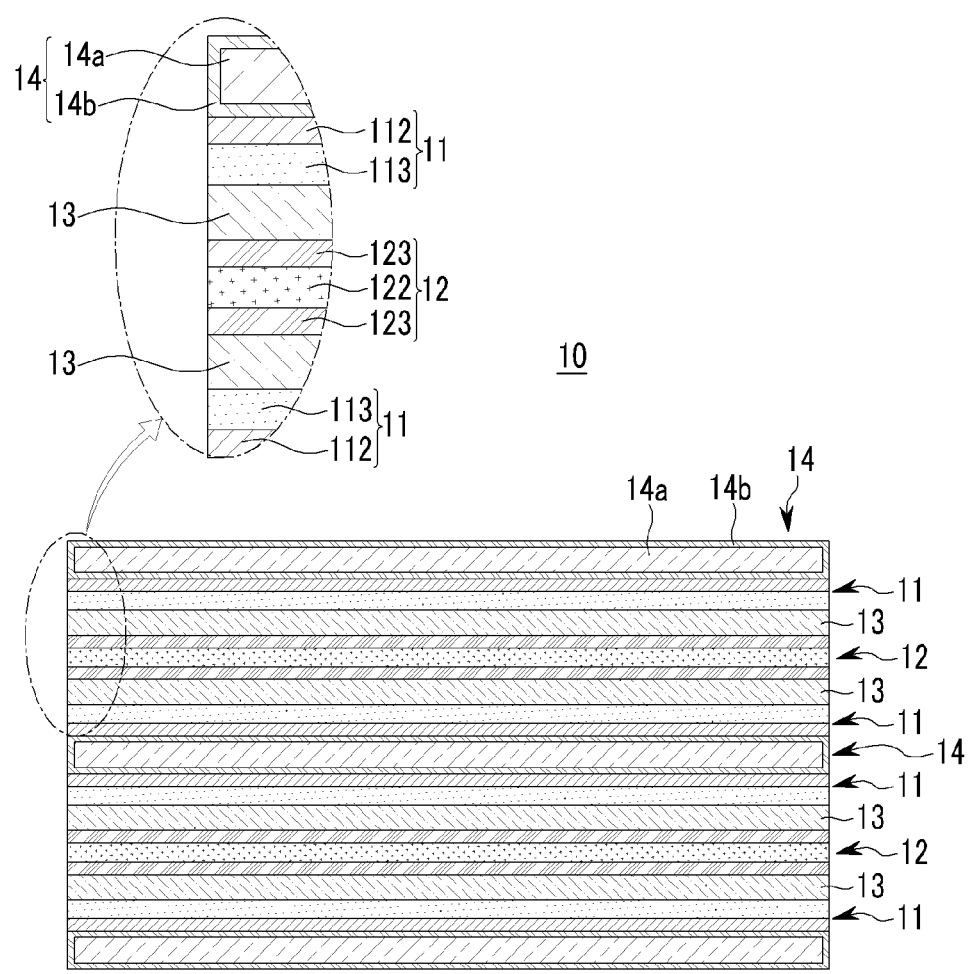
FIG. 4 is a cross-sectional view of FIG. 3, taken along the line III-III.

FIG. 3 is a perspective view of an electrode assembly according to the first embodiment of the present invention, and FIG. 4 is a cross-sectional view of FIG. 3, taken along the line III-III.

As shown in FIG. 3 and FIG. 4, the electrode assembly 10 may include a first electrode 11, a second electrode 12, and a separator 13 disposed between the first and second electrodes 11 and 12. The electrode assembly 10 may have a structure in which a plurality of first electrodes 11 and a plurality of second electrodes 12 are alternately layered, interposing the separator 13 therebetween. However, the present invention is not limited thereto, and it may have a structure in which the first and second electrodes 11 and 12 formed in band shapes are wound, interposing the separator 13 therebetween.

The separator 13 may be formed with a porous sheet, and may insulate the first and second electrodes 11 and 12 and provide a path for electrons. The separator 13 may be formed of a polyolefin-based single or complex film such as poly ethylene or polypropylene, or Manila paper.

The first electrode 11 may include a first electrode current collector 112 and a first electrode active material layer 113 attached to the first electrode current collector 112. The first electrode active material layer 113 may be attached to the first electrode current collector 112 by coating, welding, or laminating.

The first electrode current collector 112 may be formed in a rectangular sheet shape with a material such as aluminum, stainless steel, and the like.

The first electrode active material layer 113 may be formed of $LiCoO_2$, $LiMnO_2$, $LiFePO_4$, $LiNiO_2$, $LiMn_2O_4$, or a carbon-based active material, or a trivalent active material, a conductive agent, and a binder/

The first electrode uncoated region 112a, where the first electrode active material layer 113 is not formed and the first electrode current collector 112 is exposed, may be formed at an upper end of the first electrode current collector 112. The first terminal 21 may be attached to the first electrode uncoated region 112a by welding and the like.

In the present embodiment, the first electrode 11 is a positive electrode and the second electrode 12 is a negative electrode. However, the present invention is not limited thereto. That is, the first electrode 11 may be the negative electrode and the second electrode 12 may be the positive electrode.

The second electrode 12 may include a second electrode current collector 122 and second electrode active material layers 123 attached to both sides of the second electrode current collector 122.

The second electrode current collector 122 may be formed of a material such as copper, stainless steel, or aluminum, and the second electrode active material layer 123 may be formed of $Li_4Ti_5O_{12}$, a carbon-based active material, a conductive agent, or a binder. The second electrode uncoated region 122a, where the second electrode active material layer 123 is not formed and the second electrode current collector 122 is exposed, may be formed at an upper end of the second electrode 12.

The electrode assembly 10 can further include an electron absorbing member 14 formed at both external sides and the center of the electrode assembly 10. The electron absorbing member 14 may be layered to be in contact with the first electrode 11, and more particularly, the electron absorbing member 14 may contact the first electrode current collector 112. Accordingly, the first electrode active material layer 113 may be formed only at one side of the first electrode current collector 112 and the other side thereof may contact the electron absorbing member 14.

Since the first electrode current collector 112 may contact the electron absorbing member 14, electrons can be more easily absorbed when external conductive foreign particles enter therein. In addition, since the first electrode active material layer 113 is not formed at sides that do not participate in reaction, the volume can be reduced without wasting the active material.

Further, the electron absorbing member 14 may be disposed at both external sides of the electrode assembly 10 so that electrons can be easily absorbed even though the conductive foreign particles can enter from any direction. The electron absorbing member 14 disposed at the center of the electrode assembly 10 may be disposed between the first electrodes 11 so that it absorbs electrons of an electrode located adjacent to the center of the electrode assembly 10.

The electron absorbing member 14 may include an electron absorbing layer 14a and a blocking layer 14b surrounding the electron absorbing layer 14a. The electron absorbing layer 14a may be formed of a material including an acrylate-based material, and may be formed of PTMA(Poly(2,2',6,6'-tetramethylpiperidinyloxy methacrylate)).

The blocking layer 14b may be formed in a film shape that surrounds the electron absorbing layer 14a, and may be formed of a material having elasticity and impervious to ion. The blocking layer 14b may be formed of a material including one selected from a group consisting of polyamide-based elastomer, poly urethane-based elastomer, polyolefine-based elastomer, polyester-based elastomer, styrene-based elastomer, and fluorine-based elastomer.

Since the blocking layer 14b may be formed of a material impervious to ions, movement of electrons to the electron absorbing layer 14a can be stably blocked when no conductive foreign particles enter therein.

In addition, since the blocking layer 14b may be formed with the elastic material, the blocking layer 14b may be deformed to block intrusion of the conductive foreign particles. Further, the conductive foreign particles and the electron absorbing layer 14a may be connected when the blocking layer 14b is torn.

The electron absorbing member 14 may function to absorb electrons flowing through the conductive foreign particles when the conductive foreign particles intrude to the inside from the outside. When the conductive foreign particles intrude into the electrode assembly 10, the first electrode active material layer 113 or the first electrode current collector 112 may be electrically connected with the second electrode active material layer 123 or the second electrode current collector 122 so that a large amount of current instantly flows and accordingly a large amount of heat is generated, thereby causing firing or explosion of the rechargeable battery 101.

However, according to the present embodiment, the electrons may move to the electron absorbing layer 14a from the conductive foreign particles so that the firing and explosion of the rechargeable battery 101 due to the excessive current can be prevented, and accordingly safety of the rechargeable battery 101 can be improved.

Figure 5:
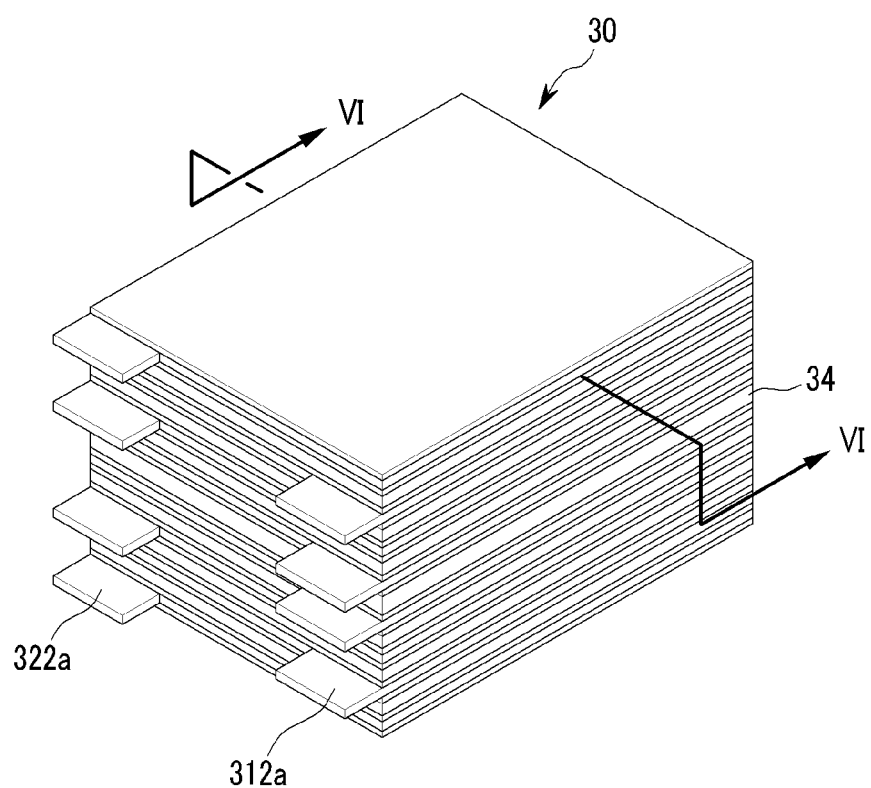
FIG. 5 is a perspective view of an electrode assembly according to a second embodiment of the present invention.
Figure 6:
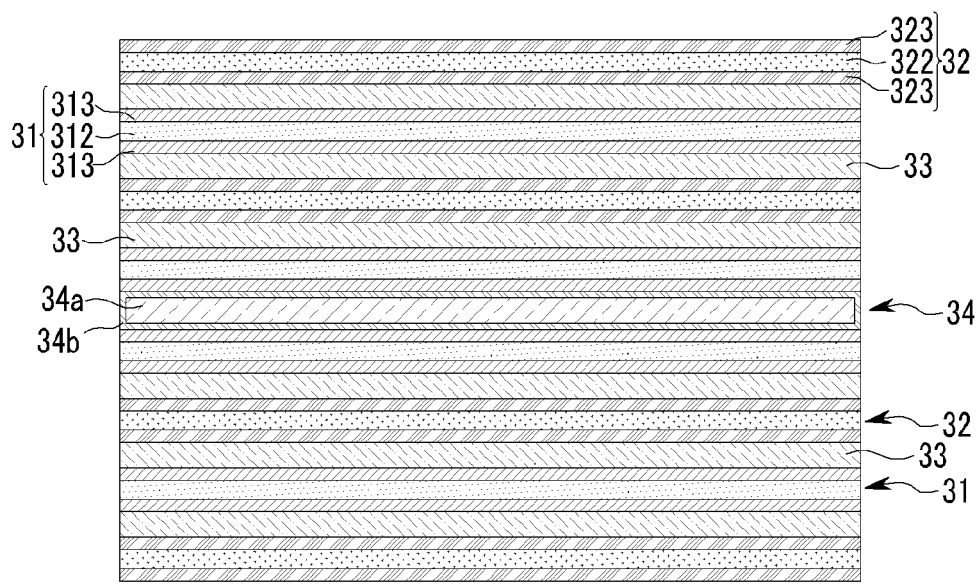
FIG. 6 is a cross-sectional view of FIG. 5, taken along the line VI-VI.

FIG. 5 is a perspective view of an electrode assembly according to a second embodiment of the present invention and FIG. 6 is a cross-sectional view of FIG. 5, taken along the line VI-VI.

Referring to FIG. 5 and FIG. 6, a rechargeable battery according to the present embodiment has a structure that is the same as the structure of the rechargeable battery according to the first embodiment, excluding a structure of an electrode assembly 30, and therefore descriptions of the same structure will not be repeated.

The electrode assembly 30 according to the present embodiment may include a first electrode 31, a second electrode 32, a separator 33 disposed between the first and second electrodes 31 and 32, and an electron absorbing member 34 disposed at the center of the electrode assembly 30.

The first electrode 31 according to the present embodiment may include a first electrode current collector 312 and first electrode active material layers 313 attached to both sides of the first electrode current collector 312. A first electrode uncoated region 312a where the first electrode active material layer 313 is not formed may be formed in the first electrode 31, and the first electrode 31 can become a positive electrode.

In addition, the second electrode 32 may include a second electrode current collector 322 and second electrode active material layers 323 attached to both sides of the second electrode current collector 322. A second electrode uncoated region 322a where the second electrode active material layer 323 is not formed may be formed in the second electrode 32, and the second electrode may become a negative electrode.

The electron absorbing member 34 may include an electron absorbing layer 34a and a blocking layer 34b surrounding the electron absorbing layer 34a. In addition, the electron absorbing member 34 may be formed in a plate shape, and arranged parallel with the first electrode 31 and thus the electron absorbing member 34 and the first plate 31 can contact each other. The electron absorbing member 34 may be provided in the electrode assembly 10 and thus be disposed at the center in the layering direction of the electrode assembly 10. In addition, the electron absorbing member 34 disposed between the first electrodes 31 and thus both sides of the electron absorbing member 34 can contact the first electrodes 31. In this case, the electron absorbing member 34 can contact the first electrode active material layer 313.

According to the present embodiment, one electron absorbing member 34 may be disposed at the center of the electrode assembly 30, and accordingly, conductive foreign particles entering from any direction can contact the electron absorbing member 34 and electrons may be absorbed through the conductive foreign particles such that flow of overcurrent can be prevented.

Figure 7:
FIG. 7 is a cross-sectional view of an electrode assembly according to a variation of the second embodiment of the present invention.

FIG. 7 is a cross-sectional view of an electrode assembly according to a variation of the third embodiment.

Referring to FIG. 7, an electrode assembly 30' according to the present embodiment may include a first electrode 31, a second electrode 32, a separator 33 disposed between the first electrode 31 and the second electrode 32, and an electron absorbing member 34 disposed at a center of an electrode assembly 30'.

The electrode assembly 30' according to the present embodiment has a structure that is the same as that of the electrode assembly according to the second embodiment, excluding the arrangement of the first and second electrodes 31 and 32, and therefore description of the same structure will not be repeated.

Since the electron absorbing member 34 is disposed between the first electrode 31 and the second electrode 31, an upper side of the electron absorbing member 34 can contact a first electrode active material layer 313 and a bottom side of the electron absorbing member 34 can contact a second electrode active material layer 323.

Figure 8:
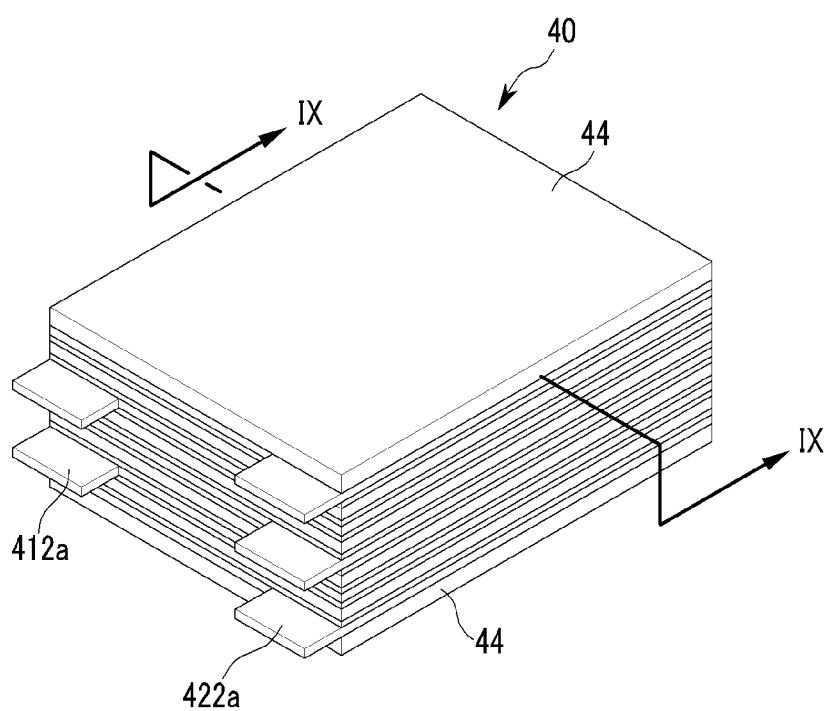
FIG. 8 is a perspective view of an electrode assembly according to a third embodiment of the present invention.
Figure 9:
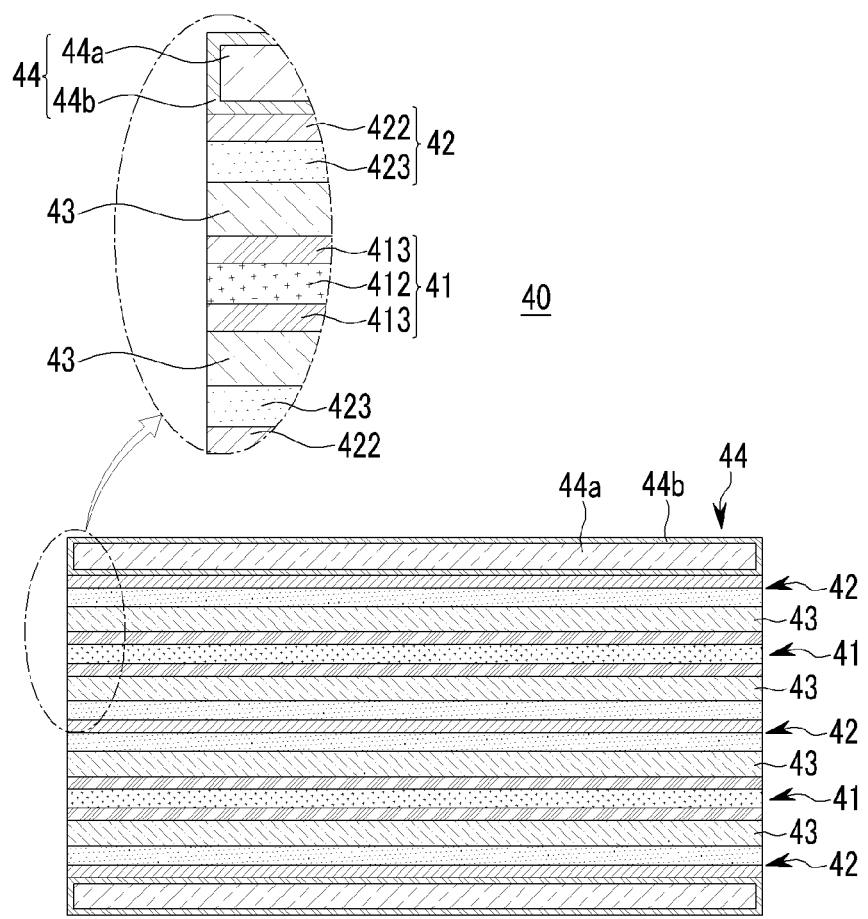
FIG. 9 is a cross-sectional view of FIG. 8, taken along the line IX-IX.

FIG. 8 is a perspective view of an electrode assembly according to a third embodiment of the present invention and FIG. 9 is a cross-sectional view of FIG. 8, taken along the line IX-IX.

Referring to FIG. 8 and FIG. 9, the rechargeable battery according to the present embodiment has a structure that is the same as that of the rechargeable battery of the first embodiment, excluding a structure of an electrode assembly, and therefore description of the same structure will not be repeated. An electrode assembly 40 according to the present embodiment may include a first electrode 41, a second electrode 42, a separator 43 disposed between the first and second electrodes 41 and 42, and electron absorbing members 44 disposed at the outermost side of the electrode assembly 40.

The first electrode 41 according to the present embodiment may include a first electrode current collector 412 and a first electrode active material layer 413 attached on the first electrode current collector 412. The first electrode 41 may be provided with a first electrode uncoated region 412a where the first electrode active material layer 413 is not formed, and the first electrode 41 may become a positive electrode.

In addition, the second electrode 42 can include a second electrode current collector 422 and second electrode active material layers 423 attached to both sides of the second electrode current collector 422. The second electrode 42 may be provided with a second electrode uncoated region 422a where the second electrode active material layer 423 is not formed, and the second electrode 42 may become a negative electrode.

Each of the electron absorbing members 44 may be formed in a plate shape, and can include an electron absorbing layer 44a and a blocking layer 44b surrounding the electron absorbing layer 44a. The electron absorbing members 44 may be respectively disposed at the outermost sides in the stacking direction of the electrode assembly 40. Since the electron absorbing members 44 can contact the second electrode 42, the second electrode active material layer 423 may be formed at only one side of the second electrode current collector 422, contacting the electron absorbing member 44, and the other side of the second electrode current collector 422 may contact the absorbing member 44.

As in the present embodiment, the electron absorbing members 44 and the second electrode current collector 422 may contact each other so that the electron absorbing members 44 can more easily absorb electrons when conductive foreign particles enter.

In addition, the electron absorbing members 44 may be disposed at both external sides of the electrode assembly 40 so that the electron absorbing members 44 can contact the entering conductive foreign particles at both sides, thereby more easily absorbing electrons.

Figure 10:
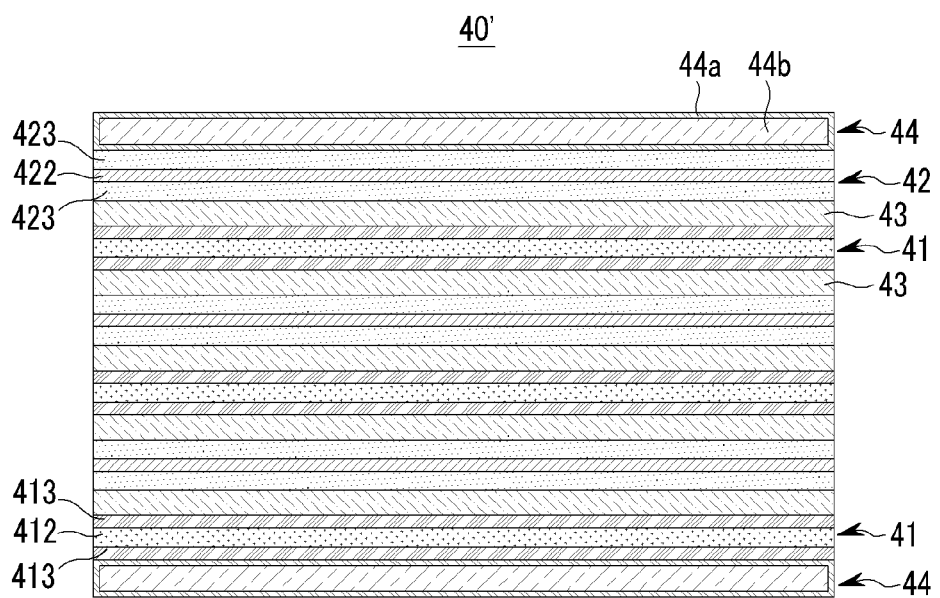
FIG. 10 is a cross-sectional view of an electrode assembly according to a variation of the third embodiment of the present invention.

FIG. 10 is a cross-sectional view of an electrode assembly according to a variation of the third embodiment.

Referring to FIG. 10, an electrode assembly 40' according to the present embodiment can include a first electrode 41, a second electrode 42, a separator 43 disposed between the first and second electrodes 41 and 42, and electron absorbing members 44 disposed at the outermost side of the electrode assembly 40'.

The electrode assembly 40' according to the present embodiment has a structure that is the same as that of the electrode assembly of the second embodiment, excluding arrangement of the first and second electrodes 41 and 42, and therefore the description of the same structure will not be repeated.

The electron absorbing members 44 are respectively disposed at the outermost sides of the electrode assembly 40' in the stacking direction. The electron absorbing member 44 disposed at the upper end of the electrode assembly 40' can contact the second electrode 42 and the electron absorbing member 44 disposed at the bottom end contacts the first electrode 41.

The electron absorbing member 44 disposed at the upper end of the electrode assembly 40' can contact a second electrode active material layer 423 and the electron absorbing member 44 disposed at the bottom end of the electrode assembly 40' can contact a first electrode active material layer 413.

Figure 11:
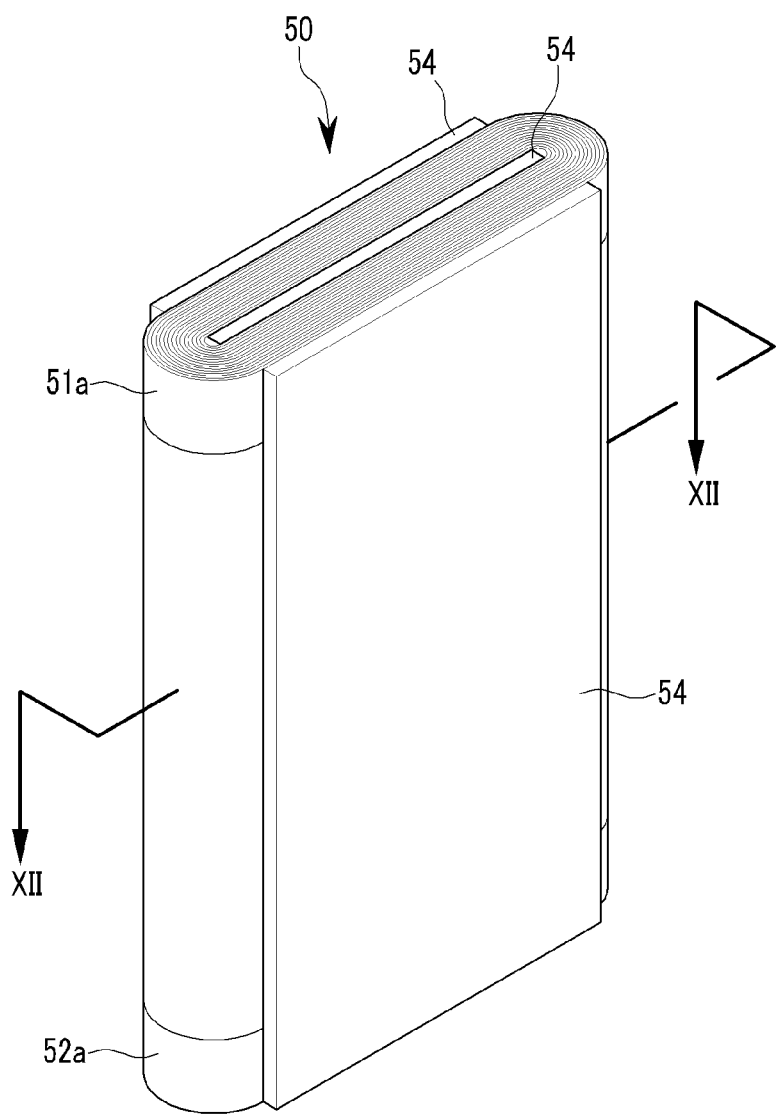
FIG. 11 is a perspective view of an electrode assembly according to a fourth embodiment of the present invention.
Figure 12:
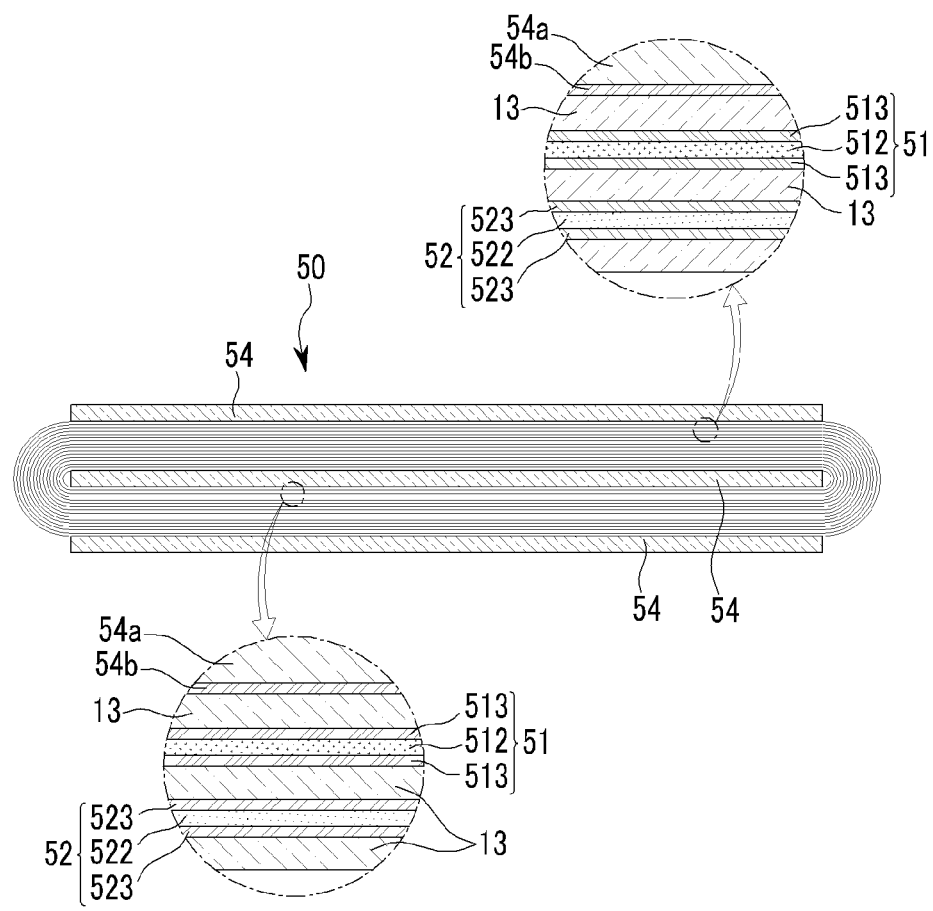
FIG. 12 is a cross-sectional view of FIG. 11, taken along the line XII-XII.

FIG. 11 is a perspective view of an electrode assembly according to a fourth embodiment of the present invention and FIG. 12 is a cross-sectional view of FIG. 11, taken along the line XII-XII.

Referring to FIG. 11 and FIG. 12, an electrode assembly 50 according to the present embodiment includes a first electrode 51, a second electrode 52, a separator 53, and electron absorbing members 54 disposed at the outermost side and the center of the electrode assembly 50.

The first electrode 51, the second electrode 52, and the separator 53 are band-shaped and elongated in one direction, and wound by interposing the separator 53 between the first and second electrode 51 and 52. After being wound, the electrode assembly 50 may be pressed to a plate shape.

The first electrode 51 according to the present embodiment can include a first electrode current collector 512 and first electrode active material layers 513 attached to both sides of the first electrode current collector 512. The first electrode 51 may be provided with a first electrode uncoated region 51a where the first electrode active material layer 513 is not formed, and the first electrode 51 can become a positive electrode.

In addition, the second electrode 52 can include a second electrode current collector 522 and second electrode active material layers 523 attached to both sides of the second electrode current collector 522. The second electrode 52 may be provided with a second electrode uncoated region 52a where the second electrode active material layer 523 is not formed, and the second electrode 52 can become a negative electrode.

The electron absorbing members 54 may be plate-shaped, and disposed at both outermost sides and the center of the electrode assembly 50. Each of the electron absorbing members 54 can include an electrode absorbing layer 54a and a blocking layer 54b surrounding the electrode absorbing layer 54a, and can contact the separator 53.

As described, according to the present embodiment, the electron absorbing members 54 may be disposed at both outer sides and the center of the electrode assembly 50 so that electrons can be more easily absorbed when external conductive foreign particles enter, thereby preventing flow of overcurrent.

While this invention has been described in connection with what is presently considered to be practical embodiments, it is to be understood that the invention is not limited to the disclosed embodiments, but on the contrary, is intended to cover various modifications and equivalent arrangements included within the spirit and scope of the appended claims.

What is claimed is:

1. An electrode assembly comprising:
   A plurality of first electrodes including a first electrode current collector and a first electrode active material layer;
   a second electrode including a second electrode current collector and a second electrode active material layer;
   a separator disposed between the first electrode and the second electrode; and
   an electron absorbing member having a first and a second side in contact with the first electrode current collector of the first electrode that comprises an electron absorbing layer and a blocking layer surrounding the electron absorbing layer such that the blocking layer physically contacts the first electrode current collector of the plurality of first electrodes on both the first and second sides of the electron absorbing member wherein the first electrode active material faces the second electrode active material with the separator interposed therebetween.

2. The electrode assembly of claim 1, wherein the electron absorbing layer comprises an acrylate-based material.

3. The electrode assembly of claim 1, wherein the electron absorbing layer is formed of PTMA(Poly(2,2',6,6'-tetramethylpiperidinyloxy methacrylate)).

4. The electrode assembly of claim 1, wherein the blocking layer is formed of an elastic material.

5. The electrode assembly of claim 1, wherein the blocking layer is formed of a material that is impervious to ions.

6. The electrode assembly of claim 1, wherein the blocking layer is formed of a material that is selected from a group consisting of polyamide-based elastomer, poly urethane-based elastomer, polyolefine-based elastomer, polyester-based elastomer, styrene-based elastomer, and fluorine-based elastomer.

7. A rechargeable battery comprising;
an electrode assembly including a plurality of first electrodes having a first electrode current collector and a first electrode active material, a second electrode having a second electrode current collector and a second elective active material, a separator disposed between the first and second electrodes, and an electron absorbing member having a first and a second side stacked with the plurality of first electrodes so as to contact the first electrode current collector on both the first and second sides of the electron absorbing member wherein the electron absorbing member comprises an electron absorbing layer and a blocking layer surrounding the electron absorbing layer positioned such that the blocking layer physically contacts the first electrode current collector wherein the first electrode active material faces the second electrode active material with the separator interposed therebetween;
a case for housing the electrode assembly; and
a terminal electrically connected with the electrode assembly and exposed outside of the case.

8. The rechargeable battery of claim 7, wherein the electron absorbing layer is formed of an acrylate-based material.

9. The rechargeable battery of claim 7, wherein the electron absorbing layer is formed of PTMA(Poly(2,2',6,6'-tetramethylpiperidinyloxy methacrylate)).

10. The rechargeable battery of claim 7, wherein the blocking layer is formed of an elastic material.

11. The rechargeable battery of claim 7, wherein the blocking layer is formed of a polymer sheet that is impervious to ions.

12. The rechargeable battery of claim 7, wherein the blocking layer is formed of a material selected from a group consisting of polyamide-based elastomer, poly urethane-based elastomer, polyolefine-based elastomer, polyester-based elastomer, styrene-based elastomer, and fluorine-based elastomer.

* * * * *